United States Patent
Pearce et al.

(10) Patent No.: US 7,818,859 B2
(45) Date of Patent: Oct. 26, 2010

(54) SELF-DRILLING PULL-THROUGH BLIND RIVET AND METHODS OF AND APPARATUS FOR THE ASSEMBLY AND SETTING THEREOF

(75) Inventors: Richard A. Pearce, Scottsdale, AZ (US); Daniel R. Smith, Kidderminster (GB); Robert M. Stanko, Guilford, CT (US)

(73) Assignee: Newfrey LLC, Newark, DE (US)

( * ) Notice: Subject to any disclaimer, the term of this patent is extended or adjusted under 35 U.S.C. 154(b) by 208 days.

(21) Appl. No.: 12/011,574

(22) Filed: Jan. 28, 2008

(65) Prior Publication Data

US 2008/0124190 A1 May 29, 2008

Related U.S. Application Data

(62) Division of application No. 10/493,820, filed as application No. PCT/US02/34877 on Oct. 31, 2002, now Pat. No. 7,322,783.

(60) Provisional application No. 60/330,875, filed on Nov. 1, 2001.

(51) Int. Cl.
B23P 11/00 (2006.01)

(52) U.S. Cl. .............. 29/243.526; 29/243.521; 72/391.4; 411/29

(58) Field of Classification Search .......... 29/243.526, 29/243.521, 243.523, 243.524, 243.525; 72/391.4, 391.8; 411/29, 30
See application file for complete search history.

(56) References Cited

U.S. PATENT DOCUMENTS

| 52,614 | A | 2/1866 | Smith | |
|---|---|---|---|---|
| 2,150,361 | A | 3/1939 | Chobert | |
| 2,248,755 | A | 7/1941 | Hathorn | |
| 2,406,157 | A | 8/1946 | Nelson | |
| 3,385,156 | A | 5/1968 | Polos | |
| 3,557,597 | A * | 1/1971 | Heslop et al. | 29/812.5 |
| 3,659,449 | A | 5/1972 | Abernathy | |
| 3,750,518 | A | 8/1973 | Rayburn | |
| 3,828,603 | A * | 8/1974 | Sheffield et al. | 72/391.6 |
| 3,892,120 | A * | 7/1975 | Sheffield et al. | 72/391.6 |
| 3,935,786 | A | 2/1976 | Murray et al. | |
| 4,003,288 | A | 1/1977 | Jeal | |
| 4,150,467 | A * | 4/1979 | Helgesson et al. | 29/26 B |
| 4,368,838 | A | 1/1983 | Sheffield et al. | |
| 4,402,637 | A | 9/1983 | Seghezzi et al. | |

(Continued)

FOREIGN PATENT DOCUMENTS

DE 2 554 577 6/1977

(Continued)

*Primary Examiner*—Lee D Wilson
(74) *Attorney, Agent, or Firm*—Harness, Dickey & Pierce, P.L.C.

(57) ABSTRACT

A rivet body is formed with cutting teeth in a forward edge of the rivet body. A mandrel is formed at a forward end with an enlarged head having a drill point thereon. A plurality of the rivet bodies are stacked on the mandrel, with the drill point. The rivet body is rotated and, through rotative coupling, the mandrel is also rotated. The rotating drill point forms pilot holes in workpieces, and the rotating cutting teeth enlarge the pilot holes to form holes for receipt of a cylindrical portion of the lead rivet body.

15 Claims, 7 Drawing Sheets

U.S. PATENT DOCUMENTS

| | | |
|---|---|---|
| 4,865,499 A | 9/1989 | Lacey |
| 4,920,833 A | 5/1990 | Rosenthal |
| 5,035,129 A | 7/1991 | Denham et al. |
| 5,154,337 A | 10/1992 | Nick |
| 5,183,357 A | 2/1993 | Palm |
| 5,190,425 A | 3/1993 | Wieder et al. |
| 5,452,505 A * | 9/1995 | Gasser .................. 29/243.526 |
| 5,529,449 A | 6/1996 | McSherry et al. |
| 5,618,142 A | 4/1997 | Sonden et al. |
| 5,913,648 A | 6/1999 | Lin |
| 7,322,783 B2 * | 1/2008 | Pearce et al. .................. 411/29 |
| 2002/0192047 A1 | 12/2002 | Willie |
| 2004/0162151 A1 | 8/2004 | Mauer et al. |
| 2004/0223832 A1 | 11/2004 | Aasgaard |
| 2004/0247412 A1 | 12/2004 | Reck et al. |
| 2008/0124190 A1 * | 5/2008 | Pearce et al. ................. 411/501 |

FOREIGN PATENT DOCUMENTS

| | | |
|---|---|---|
| EP | 0 571 110 | 11/1993 |
| GB | 2 299 288 | 10/1996 |
| WO | WO 94/00701 | 1/1994 |

* cited by examiner

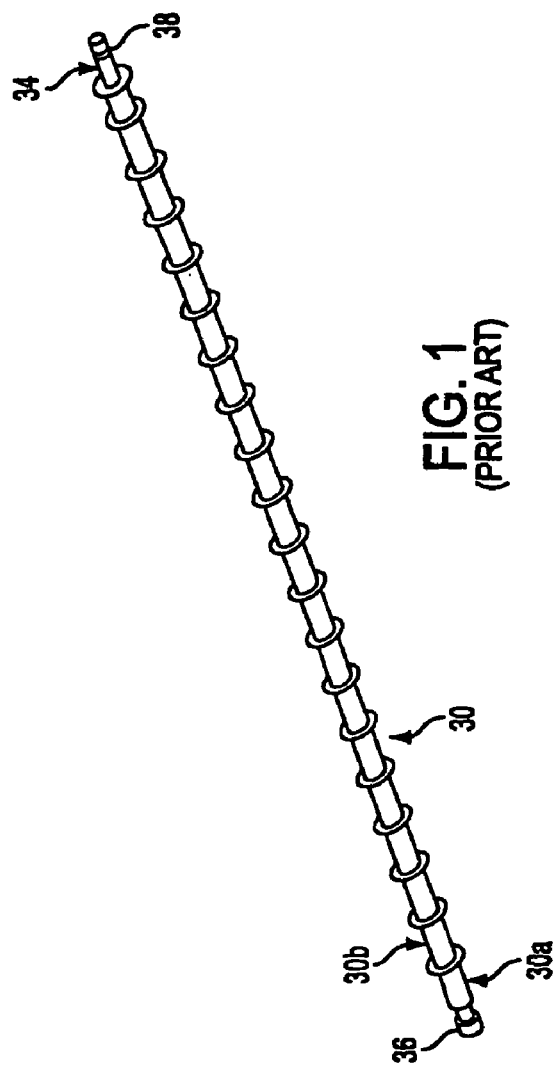
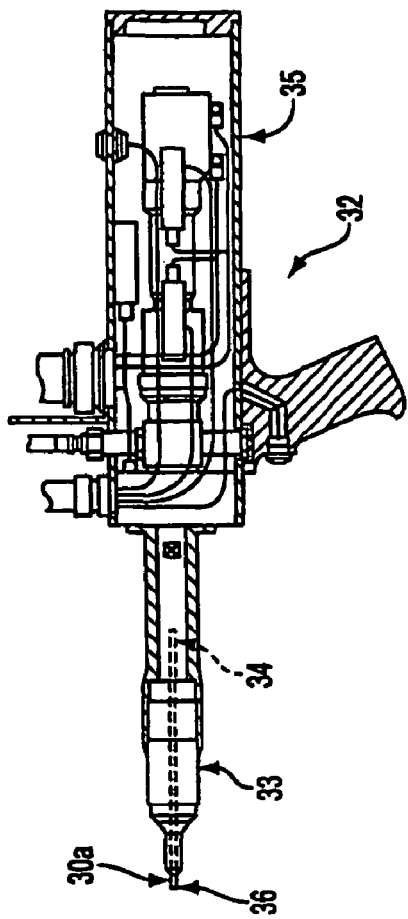
FIG. 1 (PRIOR ART)
FIG. 2 (PRIOR ART)

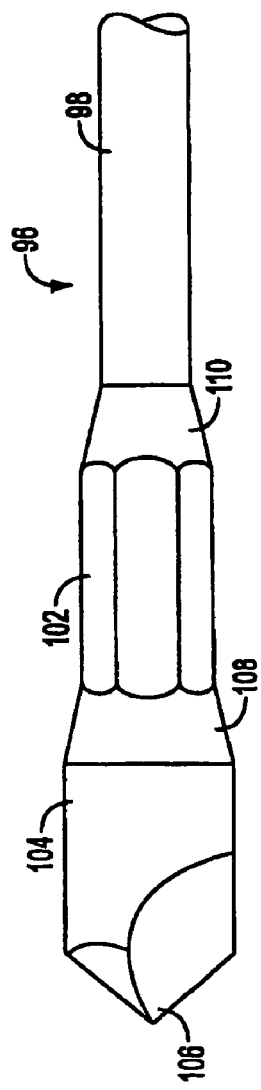
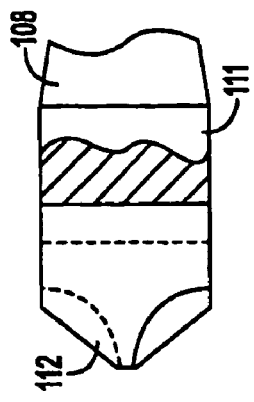
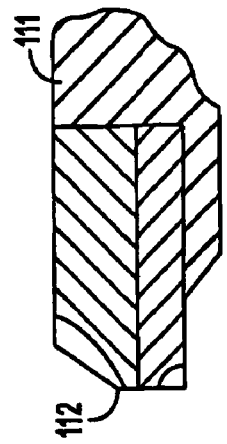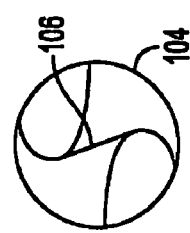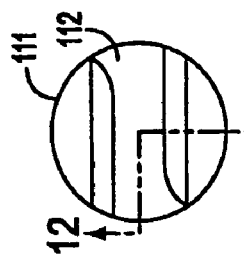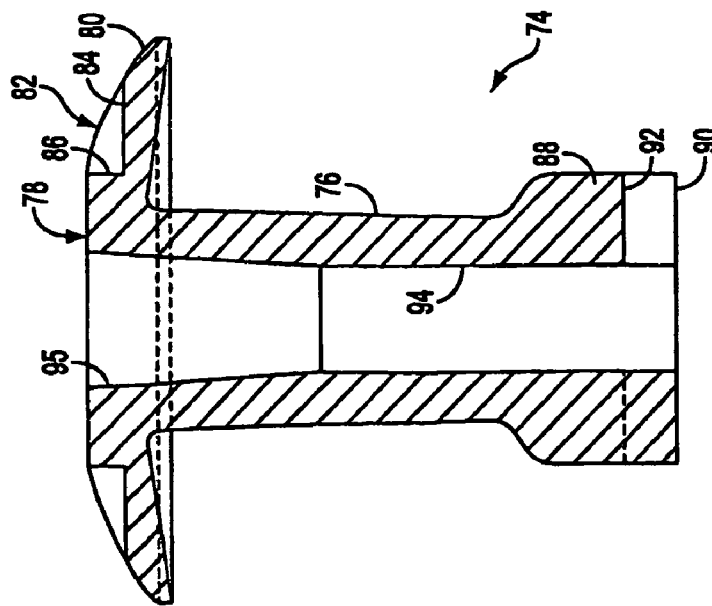

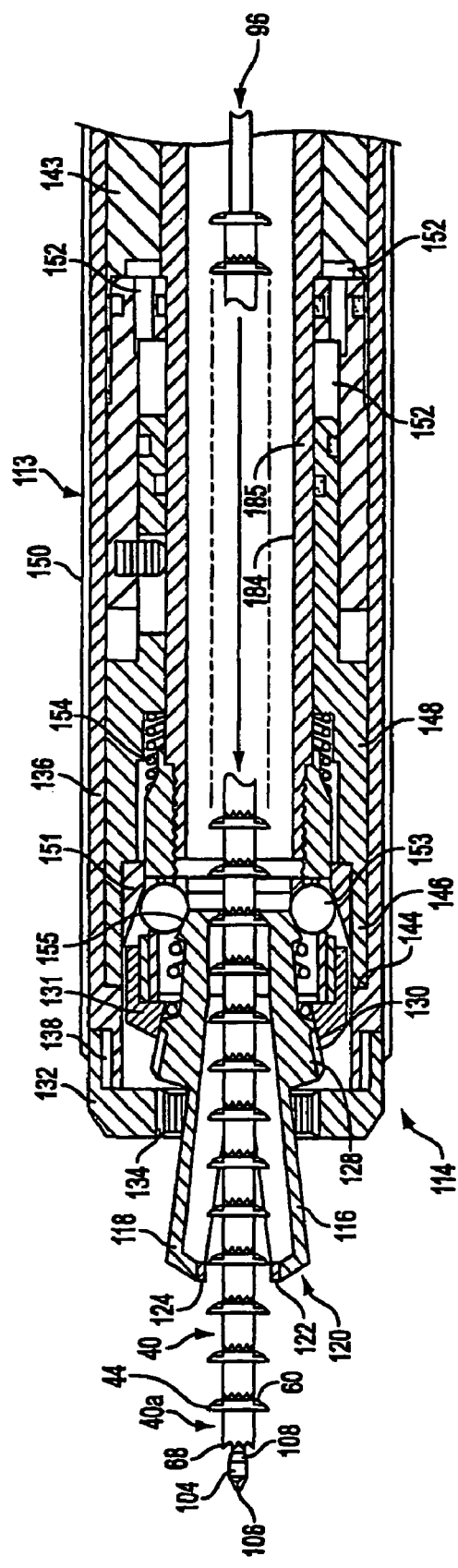
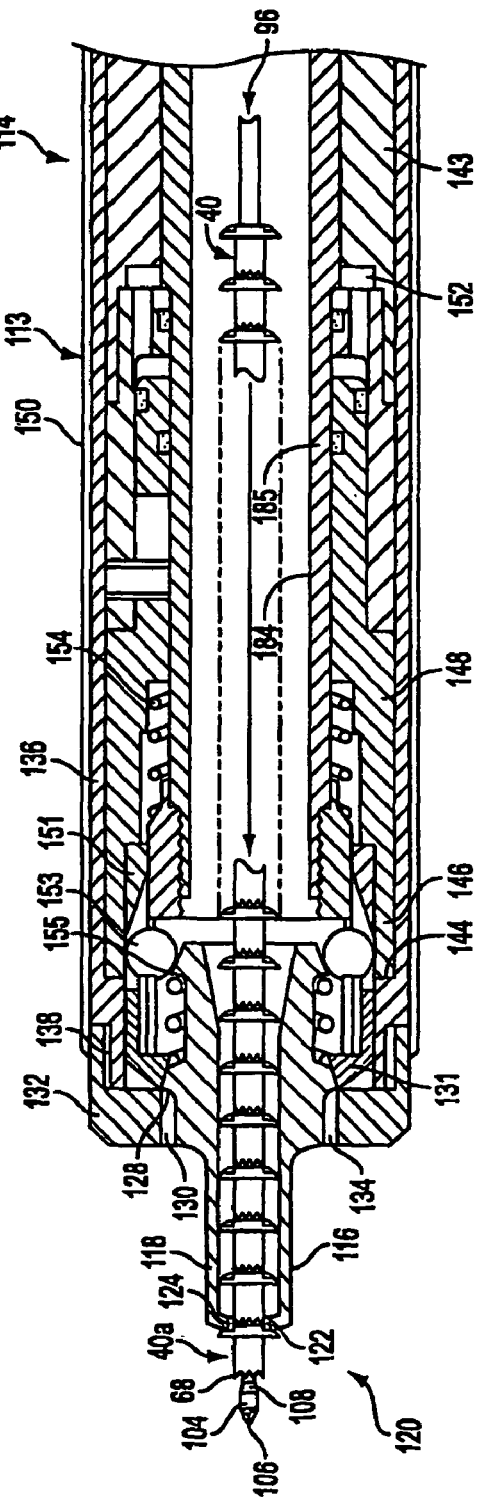
FIG. 14
FIG. 15

SELF-DRILLING PULL-THROUGH BLIND RIVET AND METHODS OF AND APPARATUS FOR THE ASSEMBLY AND SETTING THEREOF

CROSS-REFERENCE TO RELATED APPLICATIONS

This application is a divisional application of U.S. patent application Ser. No. 10/493,820 filed on Jul. 9, 2004, which is a 371 National Phase of International PCT Application PCT/US2002/034877, filed Oct. 31, 2002. U.S. patent application Ser. No. 10/493,820 and International PCT Application PCT/US2002/034877 also claim the benefit of U.S. Provisional Application No. 60/330,875, filed Nov. 1, 2001. The disclosure of the above applications are incorporated herein by reference.

BACKGROUND

This invention relates to a self-drilling pull-through blind rivet, and methods of and apparatus for the assembly and setting thereof. In particular, this invention relates to an unset self-drilling pull-through blind rivet which is structured to form a hole in a workpiece for facilitating the locating of the unset rivet therein. This invention further relates to methods of and apparatus for assembling and setting the unset rivet relative to the hole formed thereby.

A known unset rivet, or rivet body, is formed with a cylindrical portion having an axial passage, of constant diameter, formed therethrough. A first axial, or forward, end of the rivet body is a continuation of the cylindrical portion, while a second axial, or trailing, end is formed with a flange.

In one step of a known process for assembling and setting the rivet body to secure workpieces, an operator drills, or preforms, aligned holes in the workpieces. In another separate step of the known process, and using a known tool, the operator facilitates the advancement of successive rivet bodies into successive respective sets of the aligned preformed holes. Thereafter the operator facilitates the setting of the rivet bodies to form set rivets, which secure the workpieces together.

In particular, in the one step, the aligned holes are preformed in the workpieces with a diameter which facilitates eventual placement of the cylindrical portion of the rivet body therein. In the other step, a plurality of unset rivet bodies are placed, in an axial stack, on a mandrel. The mandrel includes an enlarged setting head at a forward end thereof adjacent the first rivet body of the stack. The enlarged head has a diameter greater than the diameter of the axial passage of the rivet bodies, but less than the diameter of the cylindrical portion of the rivet bodies. With this arrangement, the enlarged head precludes forward movement of the first rivet body, and the rivet bodies which follow axially behind the first rivet body. A trailing end of the mandrel is formed with a grippable structure, which facilitates gripping thereof by a gripping means within the tool.

The mandrel and the rivet bodies stacked thereon are assembled within the tool, with the enlarged setting head and the first rivet body extending from a forward end of the tool. The trailing end of the mandrel is gripped within the tool, and a forward force is applied to the flange of the last, or trailingmost, rivet body to selectively urge the stack of rivet bodies in a forward direction, and thereby maintain the rivet bodies in a tightly stacked condition during successive rivet-setting operations.

The enlarged setting head of the mandrel and a cylindrical section of the first rivet body, excluding the flange thereof, are inserted into the respective aligned holes, which have been independently preformed in the workpieces. The flange of the first rivet body engages one of the workpieces to preclude further advancement of the rivet body. In this inserted position, the mandrel head and a leading portion of the cylindrical portion at the first axial end extend forward beyond the aligned holes.

Thereafter, while the first rivet body is precluded from retraction, the mandrel is retracted axially from within the tool to pull the setting head of the mandrel through the first rivet body, from the leading end to the trailing end of the rivet body. As the head of the mandrel is pulled rearward through the leading end of the first rivet body, the head expands, or distends, the material of the extended leading portion of the cylindrical portion. The expanded material is substantially larger than the hole in the adjacent workpiece, and forms a blind-side bulge in the rivet body, which is in engagement with the adjacent workpiece. The reshaping of the rivet body, to form the blind-side bulge, results in the formation of a set rivet, which secures the workpieces together.

After the setting of the first rivet, the operator shifts the tool to another set of aligned preformed holes of the same or different workpieces and processes the second rivet body of the stack through the same steps noted above with respect to the first rivet body to set the second rivet. This process is continued for the remaining rivet bodies of the stack. Thereafter, a second plurality of rivet bodies can be stacked on the mandrel, and processed for assembly and setting.

Examples of tools and processes of the above-described type are disclosed in (1) European Patent Application No. 93303555.2, which was published on Nov. 24, 1993, as Publication No. 0 571 110, and (2) UK Patent Application GB 2 299 288, which was published on Oct. 2, 1996, both of which are incorporated herein by reference thereto.

With the above-described rivet bodies, the aligned holes must be formed through the workpieces separately and independently from the process of assembling the rivet bodies with the workpieces, thereby necessitating a multiple step process. This multiple step process is time consuming and costly, particularly when each set of aligned holes must be drilled separately and independently from the assembly of the successive rivet bodies within the respective holes. Also, care, and time, must be taken when locating and aligning the enlarged head of the mandrel in preparation for insertion of each of the stacked rivet bodies into the respective holes.

Another known tool and process for setting rivets includes a mandrel in which the forward end thereof is formed with an enlarged head having a drill point, and is useable for the setting of a single rivet only.

In use, a single rivet body is placed on the mandrel and is precluded from forward movement by the enlarged head. The mandrel, with the single rivet body thereon, is rotated about its axis and is urged forward through two workpieces to be secured together, whereby the drill point forms aligned holes therethrough. The aligned holes are formed with a diameter sized to allow passage therethrough of the enlarged head and a leading section of the cylindrical portion, and to receive the remainder of the cylindrical portion of the rivet body. Eventually, the flange of the rivet body engages an outboard surface of the adjacent workpiece to preclude further forward axial movement of the rivet body. In this inserted position, the drill point, the head and the leading section of the cylindrical portion of the rivet body extend axially outward from the aligned holes of the workpieces.

Rotation of the mandrel is stopped and the rivet body is precluded from rearward or retracting movement. The mandrel is retracted axially for a prescribed distance, whereby the enlarged head is pulled into engagement with, and expands, the leading section of the cylindrical portion of the rivet body. The expanded material of the leading section of the cylindrical portion is now substantially larger than the hole in the adjacent workpiece thereby to form a blind-side bulge in the rivet body, which is in engagement with the adjacent workpiece. A set rivet is thereby formed and the workpieces are secured together.

During the setting of the rivet, the drill point and the enlarged head of the mandrel are retracted or pulled for the prescribed distance, whereby the drill point and the enlarged head remain on the blind side of the workpieces. If the enlarged head was pulled or retracted farther than the prescribed distance, and thereby into the section of the cylindrical portion which is located within the drilled holes, the material of the section would be compromised to the extent that the rivet would be ineffective to secure the workpieces together.

Therefore, after the mandrel has been pulled for the prescribed distance, and the rivet has been set, the mandrel, the drill point and the enlarged head are not recoverable, and remain with the set rivet or can be pushed through the set rivet and discarded on the blind side of the secured workpieces. In any event, the mandrel, with the head and drill point, can not be used thereafter for a rivet-setting operation. With this system, then, each mandrel with the drill point and the enlarged head can be used only once to assemble and set a single rivet. This process is a time consuming and expensive manner of assembling and setting rivets.

SUMMARY

Therefore, it is an object of this invention to provide facility for achieving hole creation and blind riveting in a single step, thereby simplifying the setting operation.

Another object of this invention is to provide facility for achieving superior cost-effectiveness by using a mandrel with a drill point which is capable of extended use in the setting of many rivets.

A further object of this invention is to provide facility for comparative saving of time and cost in the formation of workpiece holes, eliminating the need for searching for hole locations, reducing the need for alignment of holes with the mandrel and rivet bodies, and allowing a measured quantity of rivets to be set for each loading of a setting tool.

With these and other objects in mind, this invention contemplates a rivet body with a cylindrical portion and has a first end and a second end located at opposite axial ends thereof. A flange is formed integrally with the cylindrical portion at the first end thereof. A hole enlarger is formed in a forward edge at the second end of the cylindrical portion and extends in an axial direction away from the cylindrical portion.

Additionally, this invention contemplates a rivet body with a cylindrical portion having an end and a flange formed integrally with the cylindrical portion at the end thereof. The flange is formed with an outboard surface facing axially away from the cylindrical portion. A drive coupling is formed in the outboard surface of the flange.

Also, this invention contemplates a rivet body with a cylindrical portion, and a flange formed integrally with the cylindrical portion at one end thereof. The cylindrical portion and the flange are formed with an axial passage which extends therethrough. At least a portion of the passage is formed with a coupling section.

Further, this invention contemplates a method of forming a hole in a workpiece for receipt of a cylindrical portion of a rivet body, including the steps of forming a pilot hole in the workpiece having a pilot hole diameter smaller than a prescribed diameter of an exterior of the cylindrical portion, forming a plurality of cutting teeth on a forward edge of the rivet body, rotating the rivet body and thereby the plurality of cutting teeth, and moving the rotating plurality of cutting teeth into the workpiece about the pilot hole to form an enlarged hole to a diameter greater than the pilot hole diameter and at the prescribed diameter for receipt of the cylindrical portion therein.

Still further, this invention contemplates a method of forming a hole in a workpiece for receipt of a cylindrical portion of a rivet body, including the steps of forming a plurality of cutting teeth on a forward edge of the rivet body, rotating the rivet body and thereby the plurality of cutting teeth, and moving the rotating plurality of cutting teeth into the workpiece to form a hole for receipt of the cylindrical portion therein.

In addition, this invention contemplates an apparatus for assembling a rivet body with a workpiece, including a tool housing, and a pair of jaws mounted in, and having forward portions extending from, a forward end of the housing. A driver is formed on a forward end of each of the pair of jaws and is positioned for engagement with the rivet body. The jaws are locatable in an open position where the forward portions thereof are spaced apart, and in a closed position where the forward portions thereof are in close proximity. Means are provided for rotating the pair of jaws when the jaws are in the closed position.

Also, this invention contemplates a rivet body and mandrel assembly for forming a hole in a workpiece, including a mandrel having a forward end, and an enlarged head formed on the forward end at a prescribed diameter. The enlarged head is formed with a forward end and a rearward end. A rivet body has a plurality of cutting teeth formed on a forward edge of the rivet body with the teeth extending toward the forward end of the mandrel. The rivet body is assembled on the mandrel with the plurality of cutting teeth being adjacent the rearward end of the enlarged head of the mandrel.

Other objects, features and advantages of the present invention will become more fully apparent from the following detailed description of the preferred embodiment, the appended claims and the accompanying drawings.

DRAWINGS

In the accompanying drawings:

FIG. 1 is a perspective view showing a plurality of rivet bodies mounted axially in a stack on a mandrel which is formed with a rivet setting head at a forward end thereof;

FIG. 2 is a partial sectional view of a tool, having a control section and a working section forward of the control section, which can be used to set blind rivets from the rivet bodies stacked on the mandrel of FIG. 1;

FIG. 7 is a sectional view showing a second embodiment of a rivet body having a flange at a rearward flange end thereof, a cylindrical portion extending from the flange toward a forward end of the section, and an enlarged forward section having a forward-directed plurality of cutting teeth, all in accordance with certain principles of the invention;

FIG. 8 is a side view showing a portion of a forward end of a mandrel having a hexagonal section formed near, and a first embodiment of a drill point formed at, a forward end of the mandrel all in accordance with certain principles of the invention;

FIG. 9 is an end view showing a forward end of the drill point of the mandrel of FIG. 8;

FIG. 10 is a side view showing a portion of a second embodiment of a drill point which can be formed at the forward end of the mandrel;

FIG. 11 is an end view showing a forward end of the drill point of FIG. 10;

FIG. 12 is a sectional view taken along line 12-12 of FIG. 11 showing a forward portion of the second embodiment of the drill point of FIG. 10;

FIG. 14 is a sectional view showing a portion of a tool which provides rotational drive for, and rivet-setting clamping of, the rivet bodies of FIGS. 3 and 7, with nose-piece jaws being in an open position, all in accordance with certain principles of the invention;

FIG. 15 is a sectional view showing the portion of the tool of FIG. 14 with the nose-piece jaws being in rotating, and rivet-body clamping, engagement with a lead rivet body, all in accordance with certain principles of the invention;

Figure 18:
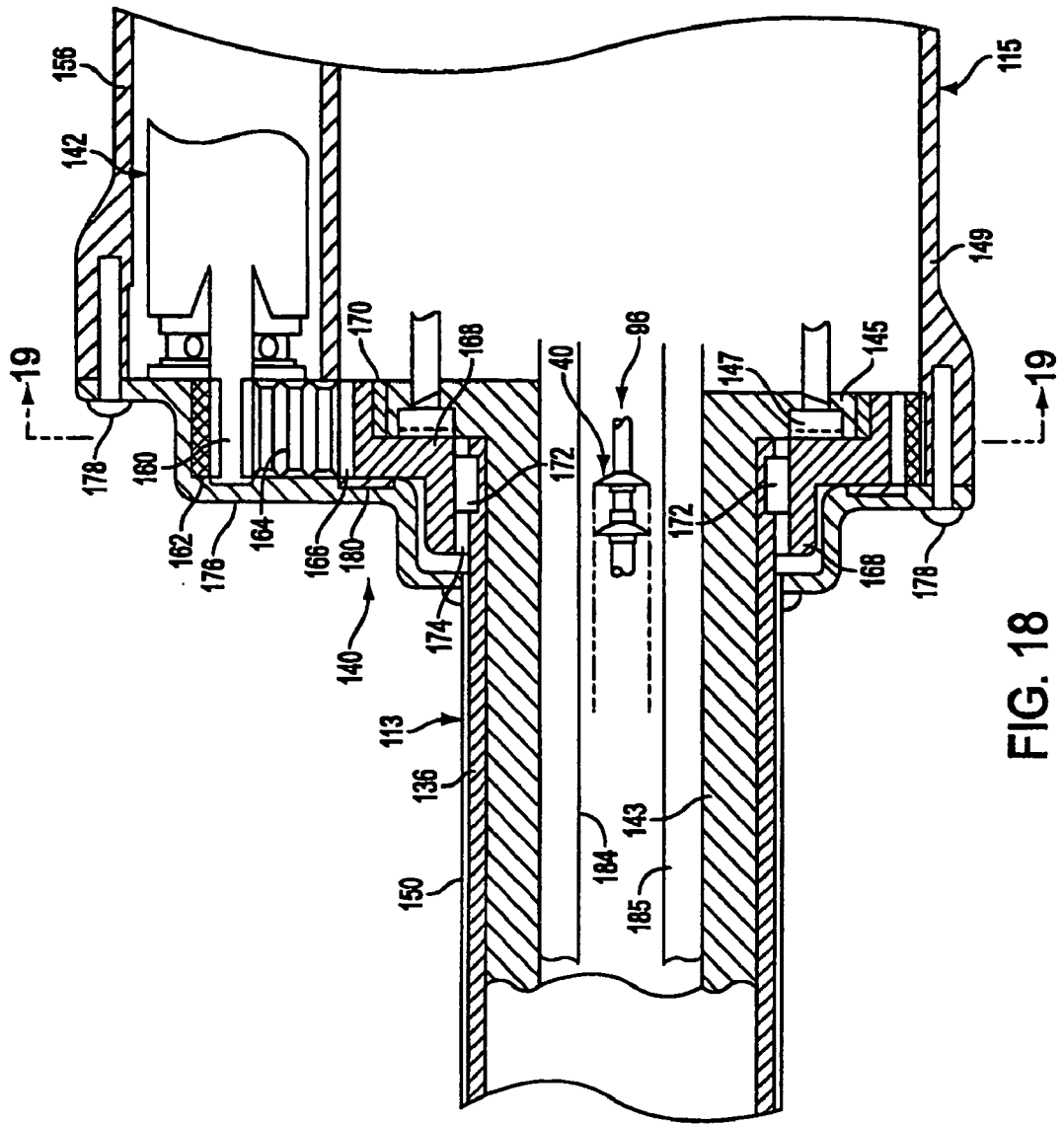
Figure 19:
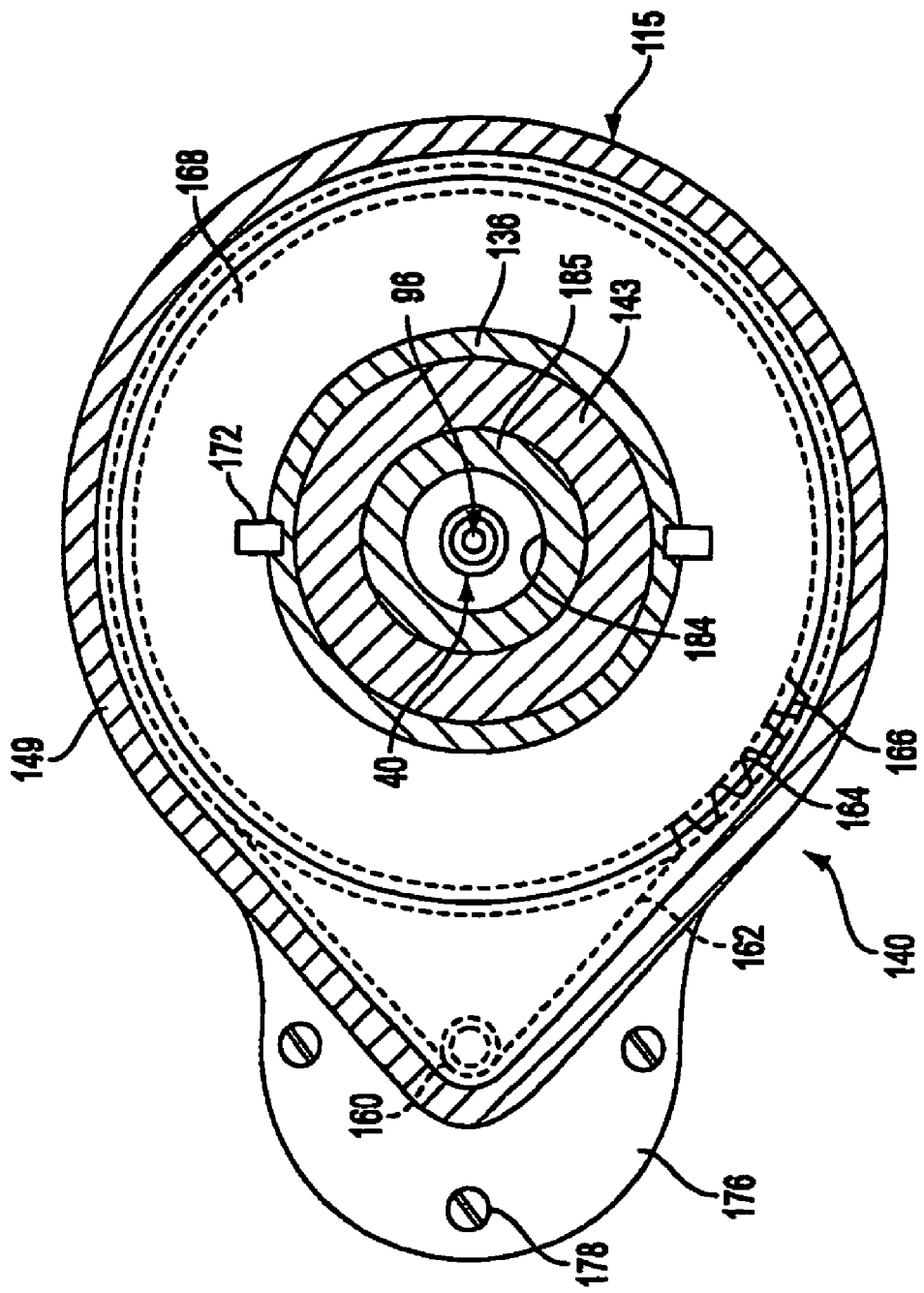

FIG. 18 is a sectional view showing a rotary drive member, contained within a housing formed on a side of a control section of the tool, and driving couplers, for rotating the nose-piece jaws of FIGS. 14 and 15, in accordance with certain principles of the invention; and FIG. 19 is a partial sectional plan view, taken along line 19-19 of FIG. 18, showing the housing of the rotary drive member and the driving couplers for coupling rotary drive to the nose-piece jaws of FIGS. 14 and 15, in accordance with certain principles of the invention.

DETAILED DESCRIPTION

Referring to FIG. 1. a known unset rivet, referred to herein as a rivet body 30, includes a cylindrical portion having an axial passage, of constant diameter, formed therethrough. A first axial, or forward, end of the rivet body 30 is a continuation of the cylindrical portion, while a second axial, or trailing, end is formed with a flange.

A known process and a known tool 32 (FIG. 2) can be used by an operator for advancing the rivet bodies 30 into through holes formed in workpieces, and for setting the resulting rivets to secure the workpieces together. Each of the holes in the workpieces is formed with a diameter of a size for receipt of the cylindrical portion of the rivet body therein.

Initially, a plurality of unset rivet bodies 30 are placed in an axial stack on a mandrel 34. The mandrel 34 is formed with an enlarged setting head 36 at a forward end thereof adjacent the lead, or first, rivet body 30a of the stack. The enlarged head 36 is formed at a diameter larger than the diameter of the passage of the cylindrical portion, but smaller than the diameter of the exterior of the cylindrical, where the enlarged setting head precludes forward movement of the first rivet body beyond the head. A trailing end of the mandrel 34 is formed with a grippable structure 38, which selectively gripped by a gripping means within the tool 32.

After the rivet bodies 30 have been stacked on the mandrel 34, by passage over the trailing end thereof, the trailing end of the mandrel is inserted nearly completely into and through the forward end of the tool 32, where the gripping means of the tool is positioned about the grippable structure 38 of the mandrel. Also, a feeding means of the tool 32 selectively applies a forward force to the flange of the last, or trailing-most, rivet body 30 to selectively urge the stack of rivet bodies in a forward direction, and to maintain the rivet bodies in a tightly stacked condition during successive rivet-setting operations. In this position, the setting head 36 and forward portions of the first rivet body 30a extend from the forward end of the tool 32, as shown in FIG. 2.

The setting head 36 of the mandrel 34 and a cylindrical section of the first rivet body 30a, excluding the flange thereof, are inserted into respective aligned holes, which have been preformed in the workpieces. The flange of the rivet body 30a engages one of the workpieces to preclude further advancement of the rivet body. In this inserted position, the mandrel head 36 and a leading portion of the cylindrical portion at the first axial end extend forward beyond the aligned holes.

The flange of the first rivet body 30a is held in engagement with the adjacent workpiece, by jaws of the tool 32, to preclude any movement, including retracting movement, of the body. Thereafter the mandrel 34 is retracted axially, by the gripping means of the tool 32, to pull the setting head 36 of the mandrel through the held first rivet body 30a, from the leading end to the trailing end thereof. As the head 36 of the mandrel 34 is pulled rearward through the leading end of the rivet body 30a, the head enlarges the material of the extended leading portion of the cylindrical portion, such that the enlarged material is substantially larger than the hole in the adjacent workpiece. The enlarged material forms a blind-side bulge in the rivet body, which is in engagement with the adjacent workpiece. In this manner, a set rivet is thereby formed and the workpieces are secured together.

After the setting of the first rivet 30a, the operator shifts the tool 32 to another set of aligned holes of the same or different workpieces and processes the second rivet body 30b of the stack through the same steps, noted above with respect to the first rivet body, to set the second rivet. This process is continued for the remaining rivet bodies 30 of the stack.

As illustrated in FIG. 2, the known tool 32 includes a working section 33, having working elements for handling and processing each successive, mandrel-stacked rivet body 30 immediately before and during the setting of the respective rivet formed from the rivet body. The known tool also includes a control section 35, a forward end of which is coupled to a rear end of the working section 33, and which houses control elements for controlling the operation of the working elements of the working section. The control section 35 also houses the gripping means for the tool 32.

While the known rivet bodies 30 can be stacked on the mandrel 34, and restrained thereon from forward movement, the holes in the workpieces must be preformed before assembly of the enlarged head and the cylindrical portion of the rivet body within and through the holes. Further, the preformed holes must be of sufficient size to allow movement of the cylindrical portion therein, and partially therethrough.

Examples of tools and processes of the above-described type are disclosed in the above-noted (1) European Patent Application No. 93303555.2, which was published on Nov. 24, 1993, as Publication No. 0 571 110, and (2) UK Patent Application GB 2 299 288, which was published on Oct. 2, 1996, both of which are incorporated herein by reference thereto.

As described above, another known tool and process for setting rivets includes a mandrel in which the forward end thereof is formed with an enlarged head having a drill point. With this system, the mandrel with the drill point and the enlarged head can be used only once to assemble and set a single rivet, and is thereafter not recoverable. Thus, for each rivet body to be set, a separate mandrel must be provided.

Referring to FIGS. 3 through 6, in a first aspect of the invention described herein, an unset rivet, referred to herein as a rivet body 40, is formed with a cylindrical portion 42 and a flange 44 at a first or trailing end of the cylindrical portion, which is formed with a uniform outer diameter. The rivet body 40 is formed with an axial passage 46, which extends axially through the body. The passage 46 is formed with a hexagonal wall 48, or coupler section, at a forward portion of the rivet body 40 and a cylindrical section 50 intermediate the forward and trailing ends of the body, with the cylindrical section being the smallest inner diameter of any portion of the passage.

The hexagonal wall 48 extends within the passage 46 for a prescribed distance from the second end of the cylindrical portion 42 toward the first end of the cylindrical portion. A first frustoconical or tapered section 52 of the passage 46 extends between a trailing end of the hexagonal wall 48 and a leading end of the cylindrical section 50. A second frustoconical or tapered section 54 of the passage 46 extends between the trailing end of the cylindrical section 50 and the trailing end of the passage.

The flange 44 is generally circular about the axis of the rivet body 40, and is formed with a generally domed outboard surface 56 and a slightly cupped undersurface 58. As shown particularly in FIGS. 3 and 4, a pair of recesses 60, or drive coupling, are formed in diametrically opposite portions of the outboard surface 56 of the flange 44. Each of the recesses 60 is formed with a flat base surface 62, which is perpendicular to the axis of the passage 46 of the rivet body 40, and a flat abutment surface 64, which is perpendicular to the base surface.

Figure 3:
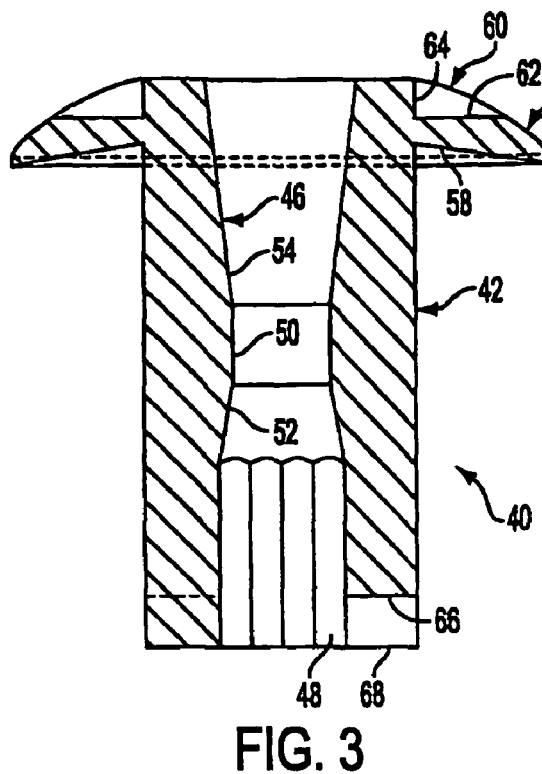
FIG. 3 is a sectional view showing a first embodiment of a rivet body having a flange at a rearward flange end thereof and a cylindrical portion extending from the flange to a forward non-flange end of the section, all in accordance with certain principles of the invention.
Figure 4:
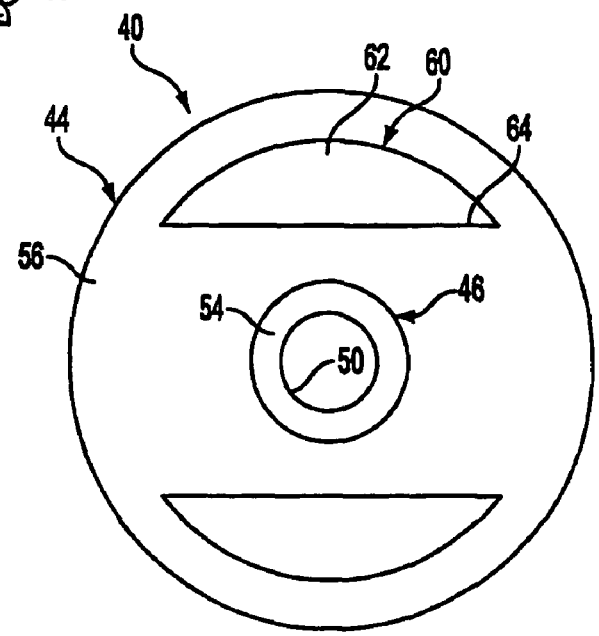
FIG. 4 is a flange end view of the rivet body of FIG. 3 showing an outboard surface structure of the flange, in accordance with certain principles of the invention.
Figure 5:
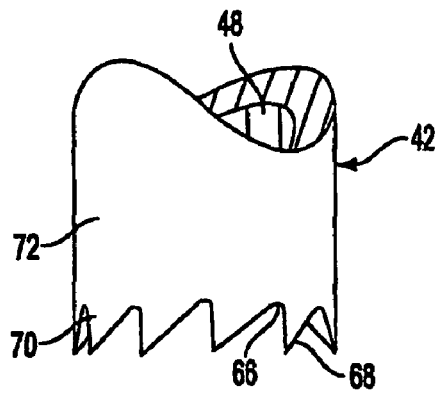
FIG. 5 is a side view of a portion of the cylindrical portion of the rivet body of FIG. 3 showing a plurality of cutting teeth formed on, and extending forward from, a forward edge of the rivet body, in accordance with certain principles of the invention.
Figure 6:
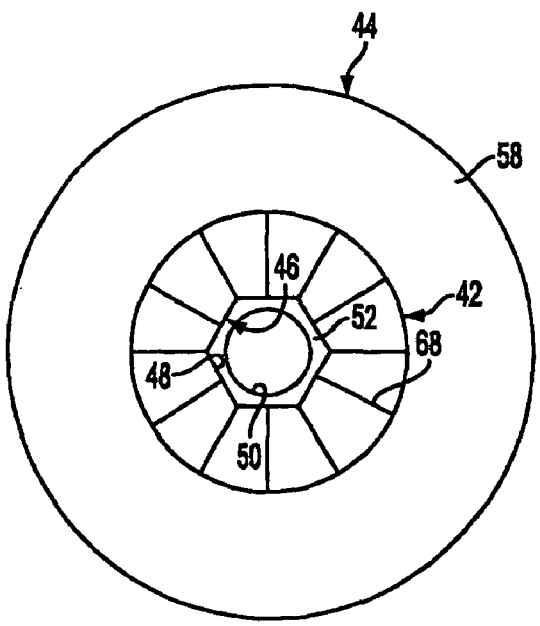
FIG. 6 is a forward end view of the rivet body of FIG. 3 showing the plurality of cutting teeth and an underside of the flange, all in accordance with certain principles of the invention.

As shown in FIGS. 3, 5 and 6, a forward edge 66 of the cylindrical portion 42, at a second end thereof, is formed with a plurality of cutting teeth 68, or hole enlarger, which extend in a forward axial direction from the forward edge. Radially outboard or exterior surfaces 70 of the cutting teeth 68 are flush with a cylindrical exterior surface 72 of the cylindrical portion 42 of the rivet body 40.

Referring to FIG. 7, in a second aspect of the invention described herein, a rivet body 74 is formed with an intermediate cylindrical portion 76 with a flange 78 formed at a first end thereof. An outboard surface 80 of the flange 78 is formed generally in a dome shape, and with a pair of recesses 82, or drive coupling, in diametrically opposite portions of the outboard surface. Each of the recesses 82 is formed with a flat base surface 84, which is perpendicular to the axis of the rivet body 74, and a flat abutment surface 86, which is perpendicular to the base surface.

The rivet body 74 is formed with an enlarged forward section 88, which has a plurality of cutting teeth 90, or hole enlarger, formed on, and extending forward in an axial direction from, a forward edge 92 of the rivet body at a second end of the cylindrical portion 76. The rivet body 74 is formed with an axial passage 94 which extends axially through the rivet body, with a common diameter along most of its length, and a frustoconical or tapered section 95 at the second end of the cylindrical portion 76. It is noted that the passage 94 of the rivet body 74 could be configured as the passage 46 of the rivet body 40, and vice versa, without departing from the spirit and scope of the invention.

The cylindrical portion 76 is formed with an exterior surface having a prescribed diameter from the first end of the cylindrical portion toward the second end thereof and to an axial juncture with the enlarged forward section 88, which has a diameter greater than the prescribed diameter.

Figure 13:
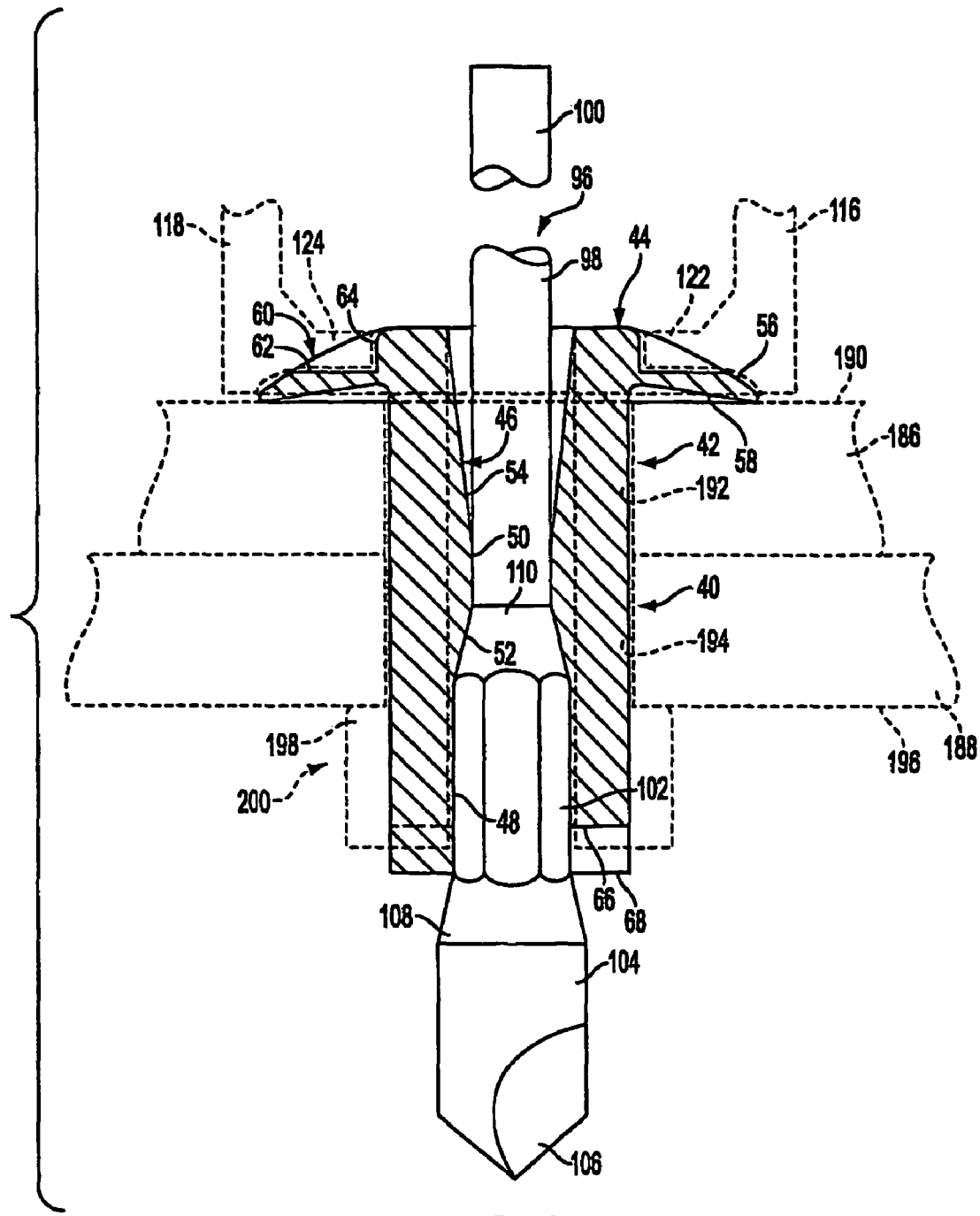
FIG. 13 is a side sectional view showing the mandrel of FIG. 8 in assembly with the rivet body of FIG. 3, and facility for rotating the rivet body and the mandrel, all in accordance with certain principles of the invention.

Referring to FIG. 8, in a third aspect of the invention described herein, a mandrel 96 is formed with a rod-like shank 98, which extends rearward to a grippable trailing end 100 (FIG. 13). A forward portion of the mandrel 96 is formed with a hexagonal section 102, which forms a coupler section, and also forms a portion of a means for setting the rivet body 40 as described below, and an enlarged head 104 formed with a hardened drill bit or hardened drill point 106 at the forward end of the mandrel. An end view of the drill point 106 is illustrated in FIG. 9. A first frustoconical or tapered section 108, which also forms a portion of the means for setting the rivet body 40 as described below, is formed between a forward end of the hexagonal section 102 and a trailing end of the head 104. A second frustoconical or tapered section 110, which also forms a portion of the means for setting the rivet body 40 as described below, is formed between the trailing end of the hexagonal section 102 and the forward end of the shank 98. The shank 98 is formed at a shank diameter, the hexagonal section 102 is formed with a transsexual dimension which is greater than the shank diameter, and the head 104 is formed at a diameter which is greater than the transaxial dimension of the hexagonal section 102. The tapered sections 108 and 110 are arranged to provide dimensional transitions between the shank 98, the hexagonal section 102 and the head 104.

Referring to FIGS. 10, 11 and 12, in an alternate design of a drill point 112, a slot is milled across the diameter of a forward end of a head 111 for receipt of a section of hardened steel or tungsten carbide, shaped as a drill point, which is brazed into place.

Referring to FIGS. 14 and 15, a tool 114, which embodies a fourth aspect of the invention described herein, includes a working section 113 having working elements for handling and processing each successive mandrel-stacked rivet body 40 and 74 immediately before and during the setting of the rivet formed from the rivet body. Referring FIGS. 18 and 19, the tool 114 also includes a control section 115, a forward end of which is coupled to a rear end of the working section 113, and which houses control elements for controlling the operation of the working elements of the working section. The working section 113 and the control section 115 combine to form a tool housing for the tool 114.

Referring again to FIGS. 14 and 15, the working elements of the working section 113 include a pair of nosepiece jaws 116 and 118 which are located at a forward end 120 of the tool 114. The jaws 116 and 118 are formed with respective lugs 122 and 124, or drivers, which extend inwardly from a forward portion of the respective jaws. The jaws 116 and 118 are selectively movable in a to-and-fro movement between an open position (FIG. 14), where the forward portions thereof are spaced apart, and a closed position (FIG. 15), where the forward portions thereof are in close proximity.

Figure 16:
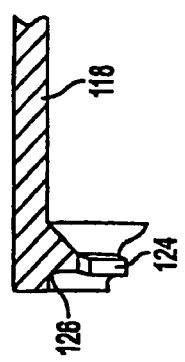
FIG. 16 is a sectional view showing a portion of one of the nose-piece jaws of FIGS. 14 and 15, in accordance with certain principles of the invention.

The configuration of the lugs 122 and 124 is complementary to the configuration of the recesses 60 formed in the outboard surface 56 of the flange 44 of each rivet body 40, and the recesses 82 of the rivet body 74. As shown in FIG. 16, a forward end of each of the jaws 116 and 118 is formed with a concave surface 126, which is complementary with the convexity of the domed outboard surface 56 of the flange 44, and mates therewith when the lugs 122 and 124 are seated in the recesses 60, or 82.

Referring to FIGS. 14 and 15, an intermediate section of each of the jaws 116 and 118 is formed with an enlargement 128 which extends radially outboard of the respective jaw, and includes a set of gear teeth 130, or gear section, formed in an outboard portion thereof. The jaws 116 and 118 are aligned in such a manner that the enlargements 128 are in alignment, radially of the axis of the tool 114. When the jaws 116 and 118 are closed (FIG. 15), the teeth 130 of the jaws effectively form a full circular gear, with the teeth extending radially outward. Also, a pivot ring 131 is formed with an inward-facing ramped surface which is in engagement with an interfacing portion of the enlargement 128 to provide a pivot point for the jaws 116 and 118 when the jaws are being moved between the open and closed positions.

Figure 17:
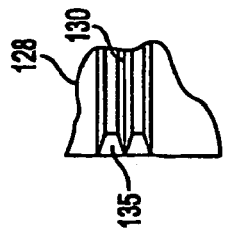
FIG. 17 is a side view showing a chamfered portion of gear teeth formed on an intermediate section of the nose-piece jaws which selectively mesh with gear teeth of a rotary drive for the nose-piece jaws, in accordance with certain principles of the invention.

A planetary gear 132, which is also referred to as a drive gear or a retaining gear, is located axially about the jaws 116 and 118, and is formed with teeth 134 (FIG. 14), which extend radially inward and are positioned to mesh with the teeth 130 of, and surround, the full circular gear formed when the jaws are in the closed position (FIG. 15). With the planetary gear 132 located about and meshed with the full circular gear formed by the teeth 130, the planetary gear assists in maintaining the jaws 116 and 118 in the closed position during rotary driving and setting cycles. Also, the planetary gear 132, when meshed with the full circular gear, provides coupling for rotary drive of the full circular gear and, thereby, the jaws 116 and 118. Further, forward ends 135 of the teeth 130, as shown in FIG. 17, and the rearward ends of the teeth 134, are chamfered to facilitate positive meshing of the teeth 130 with the teeth 134.

Thus, when the jaws 116 and 118 are in the closed position, the planetary gear 132 is located about the full circular gear, as formed by the teeth 130, to provide a means for retaining the jaws in a closed position. Also, when the jaws 116 and 118 are in the closed position, the teeth 134 of the planetary gear 132 are meshed with the teeth 130 of the full circular gear to provide a means for coupling rotational drive to the jaws.

A main drive tube 136 is threadedly attached to the planetary gear 132 at a forward end 138 of the tube. A rear end of the drive tube 136 is coupled to a gearing mechanism 140, shown in FIGS. 18 and 19, and is rotated thereby to transmit rotary drive from an air motor 142 (FIG. 18) to the planetary gear 132. When the jaws 116 and 118 are in the closed position (FIG. 15), operation of the air motor 142 results in the rotation of the jaws.

A forward portion of an axial sleeve 143 is shown in FIGS. 14 and 15, and a rear portion of the sleeve is shown in FIG. 18. The sleeve 143, which forms a support for the drive tube 136, is formed with a flange 145 at the rear end thereof, and is attached by screws 147 to a main body 149 of the control section 115 of the tool 114. As shown in FIGS. 14 and 15, the main drive tube 136 is formed with a shoulder 144, which is in the path of movement of a forward end 146 of a slide tube 148. A static cover 150 is positioned over the rotatable main drive tube 136 for safety purposes.

When the tool 114 is not in use, and the rivet bodies 40 and the mandrel 96 are not in assembly with the tool, the jaws 116 and 118 are in the closed position, as shown in FIG. 15. During selective operation of the tool 114 for the purpose of assembling the mandrel 96 and the rivet bodies 40 with the tool, the slide tube 148 is moved forward, by air pressure applied at the rear thereof through chambers 152, which are shown in FIGS. 14 and 15. As the slide tube 148 moves forward, the planetary gear 132 is moved forward (FIG. 14) to disengage the teeth 134 thereof from the teeth 130 of the jaws 116 and 118, whereby the jaws are no longer maintained together by the planetary gear.

Referring to FIGS. 14 and 15, a plurality of ball bearings 153 are mounted within a forward portion of the working section 113 of the tool 114, and are in engagement with rear bearing surfaces 155 of the jaws 116 and 118. The plurality of ball bearings 153 are located generally in a transaxial plane, but are movable slightly axially, and are movable radially when the jaws 116 and 118 are moved to-and-fro between the open position and the closed position. When the jaws 116 and 118 are in the closed position (FIG. 15), the plurality of ball bearings 153 are in a most radially outward position thereof, and are in engagement with a forward portion of the bearing surfaces 155 of the jaws.

When the tool 114 is operated to open the jaws 116 and 118, the slide tube 148 is moved forward, as described above, whereby a ramp ring 151 is moved forward. The ramp ring 151 is formed with an inclined surface internally of the ring. As the ring 151 moves forward, the inclined surface thereof engages the plurality of ball bearings 153 and urges the ball bearings to a most radially inward position thereof as shown in FIG. 14. During this radial transition of the plurality of ball bearings 153, the ball bearings are repositioned slightly on the surfaces 155 of the jaws 116 and 118 to facilitate the opening of the jaws. During this period, the enlargements 128 of the jaws 116 and 118 are pivoted about the pivot point provided by the pivot ring 131, whereby the jaws are moved to the open position (FIG. 14). Thus, the slide tube 148, the plurality of ball bearings 153, the bearing surfaces 155 of the jaws 116 and 118, and the inclined surface of the ramp ring 151 provide a means for moving the jaws from the closed position to the open position. Also, the slide tube 148 and the ramp ring 151, and the inclined surface thereof, provide a means for selectively moving the plurality of ball bearings 153 with respect to, and while in continuous engagement with, the bearing surfaces 155 to move the pair of jaws 116 and 118 from the closed position to the open position.

During forward movement of the slide tube 148, a return spring 154 is compressed as shown in FIG. 14. When the air pressure is removed from the chambers 152, the return spring 154 facilitates the return of the slide tube 148 to the rearward position shown in FIG. 15, whereby the jaw-opening process described above is reversed and the jaws 116 and 118 again assume the closed position. Thus, the return spring 154 provides a means for moving the jaws 116 and 118 from the open position to the closed position.

Referring to FIGS. 18 and 19, a motor housing 156 is formed with, and to one side of, the main body 149 of the tool 114, and contains the air motor 142 (FIG. 18) with a pinion 160 thereof extending in a forward axial direction. The side placement of the housing 156 precludes interference with a hand-held operation of the tool 114. A drive belt 162 is formed with inward facing teeth 164 which mesh with teeth of the pinion 160, and also mesh with teeth 166 of a main, or intermediate, drive gear 168, which is positioned on a bushing 170 located on an edge of the flange 145. The drive gear 168 is coupled to the drive tube 136 through two or more keys 172, which are attached to the drive tube and which are located in gear slots 174 of the drive gear. The keys 172 are free to move, in an axial direction, within the slots 174 upon axial movement of the drive tube 136.

With this arrangement, the motor 142, the pinion 160, the drive belt 162, the drive gear 168, the main drive tube 136, the planetary, or rotary drive, gear 132, and the gear teeth 130 provide a means for rotating the jaws 116 and 118 when the jaws are in the closed position.

As shown in FIG. 19, a cover 176 is welded to a rear portion of the static cover 150 (FIGS. 14 and 15), and is attached by screws 178 to a forward end of the main body 149 of the tool 114, and provides a protective cover for the gearing mechanism 140 and the forward end of the air motor 142. A brass wearing plate 180 (FIG. 18) is located within the cover 176 to accommodate any sideways thrust of the drive gear 168.

Referring to FIG. 13, in a process for supplying rivet bodies 40 and for the setting of rivets which is representative of a fifth aspect of the invention described herein, a plurality of the rivet bodies are stacked on the mandrel 96 in the same manner described above with respect to rivet body 30 and mandrel 34. The lead, or first, rivet body 40*a*, which is adjacent the head 104, slides over the shank 98 of the mandrel 96, and eventually seats in a position where the hexagonal section 102 of the mandrel is located snugly within, and in engagement with, the hexagonal wall 48 of the rivet body 40*a*, to provide a coupler between the rivet body and the mandrel. In this position, the second tapered section 110 of the mandrel 96 precludes further forward movement of the rivet body 40*a* relative to the mandrel. The remaining loaded rivet bodies 40 are stacked behind the first rivet body 40*a*, with the rivet body which is adjacent the trailing end 100 of the mandrel 96 being a trailing-most rivet body.

It is noted that coupler formed by the hexagonal wall 48 and the hexagonal section 102 could be formed in a configuration other than hexagonal without departing from the spirit and scope of the invention. For example, the wall 48 and the section 102 could be formed in a splined configuration.

The tool 114 is operated to supply air pressure to the chambers 152 to facilitate movement of the jaws 116 and 118 from the closed position (FIG. 15) to the open position (FIG. 14), as described above. The trailing end 100 of the mandrel 96, with the rivet bodies 40 stacked thereon, is then inserted into the forward open end 120 (FIG. 14) of the tool 114. The mandrel 96 and the stacked rivet bodies 40 are moved into an axial chamber 184 (FIGS. 14 and 15) formed by a fixed innermost sleeve 185 of the tool 114, with the trailing end 100 of the mandrel being moved to the rear of the tool until a gripping means (not shown), within the tool, is located about, and grips, the trailing end.

As the mandrel 96 and the stacked rivet bodies 40 are being inserted into the axial chamber 184, a feeding means (not shown) within the tool 114 is positioned to selectively engage, and apply a force to, the outboard surface 56 of the flange 44 of the trailing-most rivet body of the mandrel-stacked bodies. The selectively applied force facilitates the feeding of the rivet bodies 40 in a forward direction and maintains the rivet bodies in a tightly stacked condition during the forward advancement thereof in successive rivet-setting operations. In this position, the first rivet body 40*a*, the head 104, the drill point 106, and the portions of the mandrel 96 which are located within the passage 46 of the first rivet body, extend forward from the tool 114.

The air pressure is removed from the chambers 152, and the jaws 116 and 118 are thereby moved laterally inward to the closed position as shown in FIG. 15, as described above. As the jaws 116 and 118 are moved to the closed position, the respective lugs 122 and 124 are moved into, and seat in, the recesses 60 formed in the domed outboard surface 56 of the flange 44 of the first rivet body 40*a*.

Referring further to FIG. 13, a first workpiece 186 is in assembly with a second workpiece 188, and are to be secured together by use of a self-drilling pull-through blind rivet, such as that obtained by the setting of the rivet body 40*a*. Neither of the workpieces 186 and 188 are formed with a hole in the area where the rivet body 40*a* is to be assembled and set as a blind rivet.

The operator controls the tool 114 to release the gripping means from engagement with the mandrel 96, and to relieve the feeding means from forceful engagement with the last rivet body 40 of the mandrel-stacked bodies. Thereafter, the air motor 142 is operated to provide rotation of the planetary gear 132, and thereby the jaws 116 and 118. With the lugs 122 and 124 seated snugly in the recesses 60, the rivet body 40*a* is rotated by the rotation of the jaws 116 and 118. As described above, the rivet body 40*a* is coupled to the mandrel 96 through the hexagonal coupling provided by the hexagonal wall 48 of the rivet body and the hexagonal section 102 of the mandrel. Therefore, when the rivet body 40*a* is rotated by the rotating jaws 116 and 118, the mandrel 96 and the drill point 106 are also rotated.

The operator then locates the rotating drill point 106 at a selected location on an outboard surface 190 of the first workpiece 186, and moves the drill point through the workpieces 186 and 188 to drill aligned pilot holes. Note that the diameter of the pilot holes is smaller than the prescribed diameter of the exterior surface 72 of the cylindrical portion 42 of the first rivet body 40*a*, which precludes entry of the cylindrical portion into the pilot holes.

Eventually, as the tool 114 continues to be urged forward, the cutting teeth 68 of the rotating first rivet body 40*a* cut portions of the workpieces 186 and 188 which are radially outboard of the aligned pilot holes formed by the drill point 106. In this manner, the aligned pilot holes are enlarged to form aligned holes 192 and 194 at a diameter which is the same as the prescribed diameter of the cylindrical portion 42 of the first rivet body 40*a*. Since the outboard surfaces 70 of the cutting teeth 68 are flush with the cylindrical surface 72 of the cylindrical portion 42 of the rivet body 40*a*, the formed diameter of the enlarged aligned holes 192 and 194 are sized to receive the cylindrical portion as the portion follows the cutting teeth into the enlarged aligned holes.

The mandrel 96 and the rivet body 40*a* continue the forward movement until the cupped undersurface 58 of the flange 44 engages the outboard surface 190 of the workpiece 186, where the rivet body 40*a* is precluded from continued movement in the forward direction. With the cupped undersurface 58 of the flange 44 in engagement with the surface 190 of the workpiece 186, a forward section of the cylindrical portion 42, including the teeth 68, extends forward of, and beyond, an outboard surface 196 of the workpiece 188. Also, the enlarged head 104 and the tapered section 108 of the mandrel 96 extend forward from the teeth 68 of the rivet body 40*a*, and thereby forward of the outboard surface 196 of the workpiece 188.

At this time, the operator controls the tool 114 to stop the rotational drive of the mandrel 96 and the first rivet body 40*a*.

The jaws 116 and 118 remain in the closed position, whereby the jaws, the lugs 122 and 124, and the spring 154 hold the flange 44 of the rivet body 40a against the outboard surface 190 of the workpiece 186 and thereby provide a means for precluding retracting movement of the rivet body.

The tool 114 is then controlled to restore the gripping means and the feeding means to their active positions. The gripping means is then retracted toward the rear of the control section 115 of the tool 114 to pull the forward portions of the mandrel 96 into and within the passage 46 of the first rivet body 40a. As the pulling action commences, the tapered section 110 of the mandrel 96 engages portions of the tapered section 52 of the first rivet body 40a and progressively displaces material of the tapered section radially outward. As the mandrel 96 continues to be pulled rearward, continued movement of the tapered section 110 results in the radially outward displacement of material into the second tapered section 54 of the passage 46, which is formed in the passage for this purpose.

Eventually, the hexagonal section 102 of the mandrel 96, which follows the tapered section 110 in the radially outward displacement of the material of the rivet body 40a, to form that portion of the displaced material in a hexagonal shape. Thus, the displaced material along this portion of the passage 46 is irregular in shape.

As the hexagonal section 102 of the mandrel 96 continues to be moved rearward within and through the passage 46 of the rivet body 40a, and as the first tapered section 108 of the mandrel is moved into and through the passage, the radial displacement of the material of the rivet body within the passage continues to consolidate the filling of the portion of the passage adjacent the second tapered section 54 of the rivet body. At this stage of the displacement of material, the portion of the passage 46 adjacent the second tapered section 54 is essentially filled with the displaced material, which does not extend axially rearward beyond the outboard surface 56 of the flange 44.

The axially spaced arrangement of the tapered sections 108 and 110, provide two distinct phases of displacement of the material, i.e., a first phase by the tapered section 110 and a second phase by the tapered section 108. It is believed that the second phase of displacement, following in time from the first phase of displacement, ensures that the displaced material has a more homogenous or reinforced structure due to the two-phase double working thereof, which leads to work hardening of the displaced material and a stronger joint. Also, the first tapered section 108 provides a comparatively minimal material displacement, resulting in a polishing action in the displaced material, which provides an additional work hardening effect of the displaced material. This results in a stronger joint which could be more resistant to vibration.

As the mandrel 96 is initially retracted during the setting operation, the tapered section 108 and the head 104 of the mandrel 96 are moved into and through the portion of the passage 94, which extends axially forward of, and beyond, an outboard surface 196 of the second workpiece 188. During this period, the tapered section 108 and the head 104 expand the material of the extended leading portion of the cylindrical portion 42, including the cutting teeth 68, radially outward. The expanding material of the cylindrical portion 42 forms a blind-side bulge 198, which is moved into engagement with the outboard surface 196 of the workpiece 188 whereby a rivet 200 is effectively set. Thus, the workpieces 186 and 188 are secured together by the set rivet 200, between the flange 44 and the blind-side bulge 198.

With the setting of the rivet 200, the jaws 116 and 118 are opened, and the gripping means then moves the mandrel 96 to its forward presetting position. The feeding means insures that the second rivet body 40 of the original stack is now in the lead position to proceed with a second hole-drilling operation. Thereafter, the jaws 116 and 118 are closed to move the lugs 122 and 124 into the recesses 60 of the second rivet body 40, which is then inserted into the newly drilled holes and the second rivet is set, all in the manner described above.

When all of the rivet bodies 40, which had been stacked on the mandrel 96, have been set as rivets, the mandrel is removed from the tool 114 and another supply of rivet bodies are stacked on the mandrel and inserted within the tool, as described above, for the continued setting of rivets.

Thus, when the above-described aspects of the invention are used, the head 104 of the mandrel 96 is fully retracted through the axial passage 46 of each of the rivet bodies 40 during the setting of the corresponding rivets 200. This allows the drill point 106, and the mandrel 96, to be used in successive setting operations.

The rivet body 74 can be set as a rivet in the same manner as the above-described rivet body 40 without departing from the spirit and scope of the invention.

Also, the recesses 60 and 82 of the rivet bodies 40 and 74, respectively, and the lugs 122 and 124 of the jaws 116 and 118, respectively, can be formed in a variety of configurations other than as described above without departing from the spirit and scope of the invention. Further, the rivet bodies 40 and 74 and the jaws 116 and 118 may be formed with structure for rotating, and precluding retraction of, the rivet bodies, other than the recesses and mating lugs, to rotatingly drive, and preclude retraction of, the rivet bodies, all without departing from the spirit and scope of the invention.

In a sixth aspect of the invention described herein, a first rivet body and mandrel assembly is formed by the rivet body 40 and the mandrel 96, wherein the rivet body is coupled to the mandrel through a coupler formed by the hexagonal section 102 of the mandrel being located within the hexagonal wall 48 of the rivet body. The first rivet body and mandrel assembly also includes the teeth 68 formed on the forward edge 66 of the rivet body 40, and the drive coupling, in the form of the recesses 60, formed in the flange 44 of the rivet body. Further, the first rivet body and mandrel assembly includes the drill point 106 formed at the forward end of the mandrel 96.

A second rivet body and mandrel assembly is formed by the rivet body 74 and the mandrel 96, wherein the rivet body is mounted on the mandrel for rotation relative thereto. The second rivet body and mandrel assembly also includes the teeth 90 formed on the forward edge 92 of the rivet body 74, and the drive coupling, in the form of the recesses 82, formed in the flange 78 of the rivet body.

When using the first rivet body and mandrel assembly, the assembly is coupled through the drive coupling, i.e., the recesses 60, to an external driver, including, for example, the air motor 142, for rotational drive of the rivet body 40. By virtue of the coupler between the rivet body 40 and the mandrel 96, rotation of the rivet body is coupled to the mandrel. In this manner, with forward urging of the first rivet body and mandrel assembly, the rotating drill point 106 of the mandrel 96 can be manipulated to drill the pilot holes 192 and 194. With continued forward urging of the first rivet body and mandrel assembly, the cutting teeth 68 of the rotating rivet body 40 enlarge the pilot holes 192 and 194 for reception of the rivet body.

If pilot holes have been preformed through the work pieces 186 and 188, rotation of the mandrel 96 is not required, whereby the second rivet body and mandrel assembly may be used. When using the second rivet body and mandrel assembly, the assembly is coupled through the drive coupling, i.e., recesses 82, to an external driver, including, for example, the air motor 142, for rotational drive of the rivet body 74. This action results in the rotation of the cutting teeth 90 independently of the mandrel 96, which is not rotated. With forward urging of the second rivet body and mandrel assembly, the cutting teeth 90 of the rotating rivet body 74 enlarge the pilot holes to form holes 192 and 194 for reception of the rivet body.

In general, the above-identified embodiments are not to be construed as limiting the breadth of the present invention. Modifications, and other alternative constructions, will be apparent which are within the spirit and scope of the invention as defined in the appended claims.

What is claimed is:

1. An apparatus for assembling a rivet body with a workpiece, which comprises:
    a tool housing;
    a pair of jaws mounted in, and having forward portions extending from, a forward end of the housing;
    a driver formed on a forward end of each of the pair of jaws and positioned for engagement with the rivet body;
    the jaws being locatable in an open position where the forward portions thereof are spaced apart, and in a closed position where the forward portions thereof are in close proximity;
    a means for rotating the pair of jaws when the jaws are in the closed position;
    a means for axially displacing a mandrel associated with the rivet body;
    a first set of gear teeth on a first jaw of the pair of jaws;
    a second set of gear teeth on a second jaw of the pair of jaws;
    the first set of gear teeth and the second set of gear teeth forming a full circular gear with teeth extending radially outward when the pair of jaws is in the closed position;
    a drive gear having teeth extending radially inward in mesh with the radially outward teeth of the full circular gear; and
    a motor coupled to the drive gear.

2. The apparatus as set forth in claim 1, which further comprises:
    a means for moving the pair of jaws in a to-and-fro movement between the closed position thereof and the open position thereof.

3. The apparatus as set forth in claim 2, which further comprises:
    a means for forming a pivot point about which each of the pair of jaws is pivoted when the pair of jaws are moved in a to-and-fro movement between the closed position thereof and the open position thereof.

4. The apparatus as set forth in claim 3, which further comprises:
    a means for retaining being engageable with the first and second jaws for retaining the jaws in the closed position.

5. The apparatus as set forth in claim 4, wherein the means for retaining includes:
    a first set of gear teeth on a first jaw of the pair of jaws;
    a second set of gear teeth on a second jaw of the pair of jaws;
    the first set of gear teeth and the second set of gear teeth forming a full circular gear with teeth extending radially outward when the pair of jaws is in the closed position; and
    a retaining gear having teeth extending radially inward in mesh with the radially outward teeth of, and surrounding, the full circular gear when the pair of jaws are in the closed position.

6. The apparatus as set forth in claim 1, which further comprises:
    each of the pair of jaws being formed with rear bearing surface;
    a plurality of ball bearings mounted in the tool housing in engagement with the rear bearing surfaces; and
    means for selectively moving the plurality of ball bearings with respect to, and while in continuous engagement with, the bearing surfaces to move the pair of jaws from the closed position to the open position.

7. The apparatus as set forth in claim 1, wherein the driver comprises a lug which is formed on and extends laterally of the forward portion of the respective jaw toward the lug of the other jaw of the pair of jaws.

8. An apparatus for assembling a rivet body with a workpiece, which comprises:
    a tool housing;
    a pair of jaws mounted in, and having forward portions extending from, a forward end of the housing;
    a driver formed on a forward end of each of the pair of jaws and positioned for engagement with the rivet body;
    the jaws being locatable in an open position where the forward portions thereof are spaced apart, and in a closed position where the forward portions thereof are in close proximity;
    a means for rotating the pair of jaws when the jaws are in the closed position;
    a means for axially displacing a mandrel associated with the rivet body;
    a motor having a pinion;
    a drive belt coupled to the pinion of the motor;
    an intermediate drive gear coupled to the drive belt;
    a drive tube coupled to the intermediate drive gear;
    a rotary drive gear coupled to the drive tube; and
    a full circular gear coupled to the rotary drive gear and formed on, and by, the pair of jaws when the pair of jaws are in the closed position.

9. An apparatus for assembling a rivet body with a workpiece, which comprises:
    a tool housing;
    a pair of jaws mounted in the housing;
    a driver formed on a forward end of each of the pair of jaws and positioned for engagement with the rivet body;
    the jaws being locatable in an open position where the forward portions thereof are spaced apart, and in a closed position;
    a rotation drive mechanism configured to rotate the pair of jaws when the jaws are in the closed position;
    a mechanism adapted to move the pair of jaws between the closed position thereof and the open position thereof;
    a mechanism configured to retract a mandrel associated with the rivet body;
    a motor having a pinion;
    a drive belt coupled to the pinion of the motor;
    a drive member coupled to the drive gear;
    a rotary drive gear coupled to the drive member; and
    a circular gear coupled to the rotary drive gear and formed on, and by, the pair of jaws when the pair of jaws are in the closed position.

10. The apparatus as set forth in claim 9, wherein the pair of jaws is pivoted when the jaws are moved between the closed position thereof and the open position thereof.

11. The apparatus as set forth in claim 10, which further comprises:
   a retainer operably engageable with the pair of jaws for retaining the jaws in the closed position.

12. The apparatus as set forth in claim 11, wherein the retainer includes:
   a first set of gear teeth on a first jaw of the pair of jaws;
   a second set of gear teeth on a second jaw of the pair of jaws;
   the first set of gear teeth and the second set of gear teeth forming a full circular gear with teeth extending radially outward when the pair of jaws is in the closed position; and
   a retaining gear having teeth extending radially inward in mesh with the radially outward teeth of, and surrounding, the full circular gear when the pair of jaws are in the closed position.

13. The apparatus as set forth in claim 9, wherein each of the pair of jaws being formed with a rear bearing surface, said apparatus further comprising a plurality of ball bearings mounted in the tool housing in engagement with the rear bearing surfaces; and
   a mechanism for selectively moving the plurality of ball bearings with respect to, and while in continuous engagement with, the bearing surfaces to move the pair of jaws from the closed position to the open position.

14. The apparatus as set forth in claim 9, wherein the driver of each respective jaw of the pair of jaws comprises a lug which is formed on and extends laterally of the forward portion of the respective jaw toward the lug of the other jaw of the pair of jaws.

15. An apparatus for assembling a rivet body with a workpiece, which comprises:
   a tool housing;
   a pair of laws mounted in the housing;
   a driver formed on a forward end of each of the pair of laws and positioned for engagement with the rivet body;
   the laws being locatable in an open position where the forward portions thereof are spaced apart, and in a closed position;
   a rotation drive mechanism configured to rotate the pair of laws when the jaws are in the closed position;
   a mechanism adapted to move the pair of laws between the closed position thereof and the open position thereof;
   a mechanism configured to retract a mandrel associated with the rivet body;
   a first set of gear teeth on a first jaw of the pair of jaws;
   a second set of gear teeth on a second jaw of the pair of jaws;
   the first set of gear teeth and the second set of gear teeth forming a full circular gear with teeth extending radially outward when the pair of jaws is in the closed position;
   a drive gear having teeth extending radially inward in mesh with the radially outward teeth of the full circular gear; and
   a motor coupled to the drive gear.

* * * * *

UNITED STATES PATENT AND TRADEMARK OFFICE
CERTIFICATE OF CORRECTION

| | | |
|---|---|---|
| PATENT NO. | : 7,818,859 B2 | Page 1 of 1 |
| APPLICATION NO. | : 12/011574 | |
| DATED | : October 26, 2010 | |
| INVENTOR(S) | : Richard A. Pearce et al. | |

It is certified that error appears in the above-identified patent and that said Letters Patent is hereby corrected as shown below:

Title Page (56) References Cited, page 2, U.S. PATENT DOCUMENTS, "2004/0162151", "8/2004" should be -- 9/2004 --.

Column 18,
Lines 7, 8, 10, 14, and 15, "laws" should be -- jaws --.

Signed and Sealed this
Fifteenth Day of February, 2011

David J. Kappos
*Director of the United States Patent and Trademark Office*